United States Patent [19]

von Pechmann

[11] Patent Number: 4,506,696
[45] Date of Patent: Mar. 26, 1985

[54] GAS TIGHT PLUG VALVE

[76] Inventor: Heinz A. von Pechmann, 7903 Meadowvale, Houston, Tex. 77063

[21] Appl. No.: 506,034

[22] Filed: Jun. 20, 1983

[51] Int. Cl.³ .............................................. F16K 5/22
[52] U.S. Cl. ........................... 137/246.11; 137/246.22; 251/309; 251/312; 251/316
[58] Field of Search ............... 137/246.11, 246.22, 137/246.12, 246.16, 246.21; 251/309, 310, 311, 312, 316

[56] References Cited

U.S. PATENT DOCUMENTS

| | | | |
|---|---|---|---|
| 1,086,221 | 2/1914 | Reynolds | 251/312 |
| 2,461,041 | 2/1949 | Donaldson | 137/246.22 |
| 2,646,960 | 1/1949 | Ericson | 251/102 |
| 2,647,720 | 8/1953 | Volpin | 137/246.22 |
| 2,954,961 | 10/1960 | Stogner et al. | 251/316 |
| 3,133,722 | 5/1964 | McGuire et al. | 251/317 |
| 3,346,002 | 10/1967 | Thompson, Jr. et al. | 137/246.22 |

Primary Examiner—George L. Walton
Attorney, Agent, or Firm—Norvell & Associates

[57] ABSTRACT

A rotatable valve member for use in controlling fluid flow in a conduit, such as a conduit used for the transmission of liquids and gas in oil servicing operations, is disclosed. The plug valve has a rotatable cylindrical plug member received within a body member. Two semi-cylindrical inserts are positioned between the rotatable plug and the body member, each insert having a tapered outer surface and a cylindrical inner bore. A close fitting surface on the inner bore of the insert establishes a gas tight metal-to-metal seal with the plug. Lubrication is injected through the plug into a groove on the close fitting insert sealing surface. A trapezoidal seal is received in a mating groove on the tapered exterior of the insert.

17 Claims, 4 Drawing Figures

GAS TIGHT PLUG VALVE

BACKGROUND OF THE INVENTION

1. Field of the Invention

This invention relates to plug valves having a transverse cylindrical plug member rotatable to open and close a fluid transmission conduit and especially related to plug valves used for the transmission of liquids and gas in the performance of oil field services.

2. Description of the Prior Art

Conventional plug valves have been employed in oil field service applications, such as cementing, fracturing and acidizing. Conventional plug valves comprise a cylindrical plug member disposed transversely to a fluid transmission conduit and rotatable to both open and close the fluid transmission conduit. Such conventional plug valves are generally positioned within an external housing or body attached within the fluid transmission conduit or flow line. A separate tapered insert, normally comprising two tapered or conical halves, is generally positioned between the cylindrical plug and the body within a tapered body bore extending transverse to the fluid transmission line. In order to render such conventional plug valves suitable for gas service or for use with corrosive fluids, a liner fabricated from a inert material, such as polytetrafluoroethylene, is generally inserted between the plug member and the tapered insert. In such gas applications, lubrication of the inner face between the cylindrical plug member and the inner bore of the tapered insert is difficult, if not impractical. A conventional plug valve used in oil field service applications is disclosed in U.S. Pat. No. 3,133,722.

SUMMARY OF THE INVENTION

A plug valve having a gas tight seal is especially useful in performing oil field service operations. The plug valve is used to control the flow of fluids, including the flow of gas, in a fluid transmission conduit or flow line and includes a body, a cylindrical plug, and an insert between the plug and the body. The body has a tapered bore and has inlet and outlet ports which can be attached within the fluid transmission conduit. A rotatable cylindrical plug is positioned within the body, and one or more tapered inserts is positioned within the tapered body bore between the cylindrical plug and the body. The insert is aligned relative to the body, and holes through the insert are aligned with the inlet and outlet ports in a position in which rotation of the plug will orient a passageway extending therethrough in either an open or closed position relative to the inlet and outlet ports. Lubricant can be injected through the plug and deposited at the inner face between the plug and the insert in surrounding relationship to the plug passageway and to the holes through the inserts.

A closely fitting surface which may be lapped or honed is located on the inner cylindrical bore of the insert in surrounding relationship to the insert holes to establish a gas-tight metal-to-metal seal with the exterior of the plug. Rectilinear grooves or recesses can be provided on the interior surface and exterior surface of the insert to receive either a sealing element or to communicate with channels extending axially and radially through the cylindrical plug. Both the inner lubricating groove and the outer recess on the insert are fabricated by simple longitudinal and rotary movement of the frustro-conical insert relative to a stationary cutting element or workpiece. The groove on the exterior of the insert comprises a trapezoidal projection onto the tapered surface and receives a trapezoidal sealing element, such as an elastomeric sealing element resistant to corrosive materials and suitable for high pressure and high temperature applications.

DESCRIPTION OF THE PREFERRED EMBODIMENT

Figure 1:
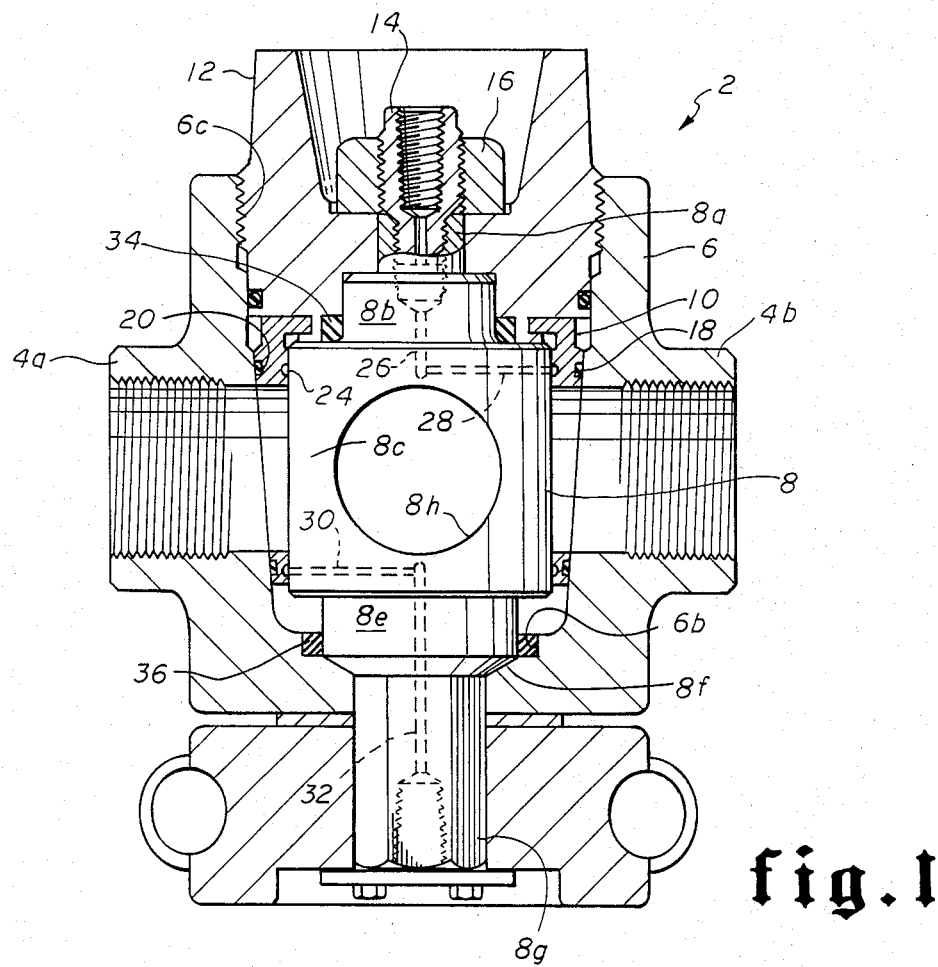
FIG. 1 is a sectional view showing the assembled plug valve in the closed position.
Figure 2:
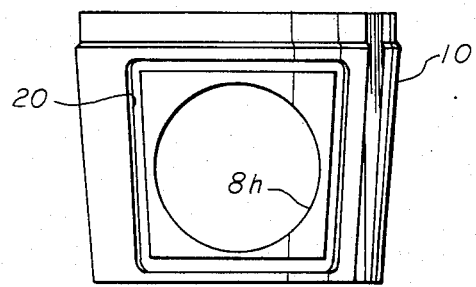
FIG. 2 is a view of the tapered exterior of the insert.

The plug valve 2 shown in the closed position in FIG. 1 comprises a body member 6 having end connections 4a and 4b for attachment to a flow line or fluid transmission conduit, such as a flow line used for oil field service operations. Two mating tapered inserts 10 are received within the tapered bore of body 6. Tapered inserts are positioned between the body 6 and a centrally disposed rotatable cylindrical plug 8 having a fluid passageway 8h extending therethrough. In FIG. 1, the cylindrical plug is rotated to a position in which the central fluid passageway is not in alignment with the inlet and outlet ports in end connections 4a and 4b. A nut member 12 is located at the upper end of the body and engages both the body and each insert 10 to align the inserts relative to the body 6. A lubricating adapter fitting 14 is secured at the upper end of the cylindrical plug 8 which is movable relative to the upper nut member 12. An outer fitting or nut 16 engages both the lubricating fitting 14 and a surface on the nut member 12 to axially position the rotatable cylindrical plug relative to the insert 10 and body 6.

In the preferred embodiment of this invention, body 6 comprises a unitary metallic member which may be fabricated from an alloy steel suitable for use in handling fluids used in oil field service applications. In the preferred embodiment, the end connections 4a and 4b have suitable internal threads on the inlet and outlet bore for connection with portions of the fluid transmission conduit adjacent the valve. The tapered bore of body 6 has an axis which in the preferred embodiment of this invention extends perpendicular to the axis of the inlet and outlet ports and to the axis of the flow line adjacent the body. A suitable cylindrical opening 6b is provided at the lower end of the tapered bore 6a and the upper end of the tapered bore is opened with suitable threads 6c defined therearound.

Rotatable cylindrical plug 8 comprises a central cylindrical section 8c. An upper stem is formed by progressively stepped cylindrical projections 8a and 8b are located at the upper end of the central cylindrical section 8c. A lower stem is similarly formed by similar stepped sections 8e, 8f and 8g are located at the lower end thereof. A straight cylindrical passageway 8h is defined through the central section 8c and, in the preferred embodiment of this invention, the passageway 8h is perpendicular to the axis of rotation of the cylindrical plug 8. Axially extending channels 26 and 32 extend inwardly from the ends of the stepped cylindrical projections at opposite ends of the cylindrical plug 8. In the preferred embodiment, these axially extending channels have conventional internal threads, such as NPT threads, adjacent the exterior end of the cylindrical projections on the plug 8. The axially extending channels 26 and 32 extend along only a portion of the length of the plug 8. The axial extension terminates short of the radially extending passageway 8h in the central cylindrical plug section 8c, although each axial channel does extend into the larger central cylindrical section 8c. Radial channels 28 and 30 communicating with the exterior of cylindrical section 8c at axially and circumferentially spaced locations are aligned to intersect separate axial channels 26 and 32 at the upper and lower end of the cylindrical section 8c respectively. These radial channels provide communication at the periphery of the cylindrical section 8c with the upper and lower ends of the cylindrical plug 8. The axial channels 26 and 32 are accessible when the plug 8 is positioned within body 6 as shown in FIG. 1.

Two opposed frustro-conical tapered inserts 10 are positioned between the cylindrical plug 8 and the valve body 6. Each insert 10 comprises a generally conical half section having a cylindrical inner surface 10d and a tapered or conical outer surface 10c. In the preferred embodiment of this invention, the inserts are unitary metallic members eventually having a ground inner surface. Each insert has a hole 10b extending therethrough which can be aligned with the inlet and outlet ports in the end connections 4a and 4b. As seen in FIG. 1, each insert has a inwardly projecting lip 10a at one end thereof. Lip 10a provides means in conjunction with nut member 12 for aligning insert 10 relative to the body 6 so that the holes in the insert are in alignment with the inlet and outlet ports respectively. Nut member 12 has a groove 12b for receiving projecting lip 10d. When nut member 12 is threaded relative to housing 6, make up of threads 12a brings the insert and insert holes into proper alignment with inlet and outlet ports.

Figure 3:
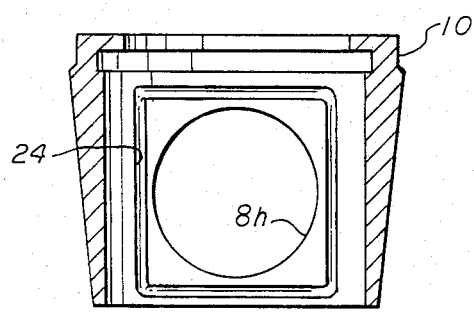
FIG. 3 is a view of the cylindrical interior bore of the insert.

In the preferred embodiment, each insert 10 has an inwardly protuberant surface surrounding each inlet hole on the inner cylindrical bore 10d. This inwardly protuberant or raised surface 22 can be lapped or honed, as seen in FIG. 3, extends over a portion of the arc of the inner cylindrical bore of the insert. Inwardly protruding surface 22 provides a metal-to-metal bearing surface relative to the exterior of cylindrical plug section 8c so that a metal-to-metal gas tight seal is maintained between the cylindrical plug and the insert 10 completely surrounding each insert hole 10b. The frictional force can be reduced by providing a relief on the insert between the insert and plug on opposite sides of opening 10b. Thus the inwardly protruding surface 22 is defined between the relief portions on opposite ends of bore 10d. A rectilinear groove 24 completely surrounds the insert hole 10b and is defined in the closely fitting metal-to-metal sealing surface 22 on the interior bore 10d. This groove is positioned between the edges of the metal-to-metal sealing surface defined by relief portions on either end of insert 10 and the edges defined by insert hole 10b. When lubricant or grease is injected into the groove 24, lubricant will be centrally disposed and is positioned to flow in opposite directions to progressively wipe the entire metal-to-metal sealing surface 22. Even complete lubrication can thus be established.

Figure 4:
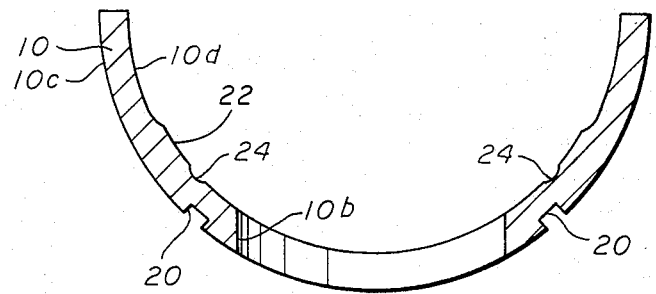
FIG. 4 is a cross-section of the insert taken along section lines 4—4.

In the preferred embodiment, rectilinear groove 24 is defined within the confines of the inwardly protuberant raised or lapped surface 22 on the inner cylindrical bore of the insert 10. This groove is formed by relative movement of the insert to a stationary workpiece, such as a spherical ball end mill. The lubricating groove 24 thus has a generally curved profile as seen in FIG. 4. The groove 24 can be simply and efficiently formed by a combination of longitudinal movement of the insert parallel to the insert axis and rotational movement about the insert axis relative to a fixed cutting or milling element. For example, if the operation begins at the upper left hand corner of the groove 24 as shown in FIG. 3, upward movement of the insert relative to the fixed cutting element parallel to the axis of the cylindrical bore will define the first longitudinally extending groove section extending from above the insert hole 10b to below the insert hole. Rotational movement about the axis of the cylindrical insert bore will define the lower section. Longitudinal movement in a direction parallel to both the insert axis and the first longitudinal groove section will define a second oppositely positioned longitudinal groove section which could then be followed by rotational movement about the same arc to define a laterally extending groove section on the opposite end of the insert hole 10b to complete the continuous groove 24. If the radial position of the cutting element relative to the insert remains fixed, a continuous groove having a constant depth and constant profile can be defined in this manner.

A trapezoidal O-ring groove 18 can be defined on the exterior tapered surface 10c of insert 10 to completely encompass the insert bore 10b. The trapezoidal O-ring groove defined on the exterior of the tapered insert has sides perpendicular to the outer tapered surface of the insert. The continuous trapezoidal recess 20 found on the exterior of the tapered insert is defined by a combination of uni-directional longitudinal movement and rotational movement of the insert relative to a cutting tool or workpiece. The continuous recess has a contour corresponding to a rectilinear tracing of a point on a moving insert in a plane tangent to the tapered exterior surface of the insert and defining a rectangle in that plane. In another sense, if a workpiece defines a rectilinear path in a plane tangent to the tapered exterior surface of the insert, longitudinal and rotary movement of the tapered exterior surface relative to a stationary workpiece in the tangential plane will define a trapezoidal recess on the exterior of the insert. The contour of the exterior recess is defined by relative longitudinal movement of the insert parallel to the projection of the insert axis in the plane tangential to the exterior surface. As the tool moves longitudinally relative to a fixed stationary cutting workpiece, the first longitudinal section of the groove is defined and extends from above the insert hole to below the insert hole. At this point, a first lateral groove section is defined by rotation of the insert about the tangential plane projection of the insert axis through a prescribed arc. A second longitudinal section can then be defined by longitudinal movement in the opposite direction against parallel to the tangential plane projection of the insert axis and parallel to the direction of movement defining the first longitudinal section. Note that although the insert has been moved along a simple uni-directional path, the two longitudinal sections define the diverging sides of a trapezoid when the rectangle is projected onto the tapered insert exterior surface. The final lateral section of the O-ring groove is defined by rotation in opposite direction again about the tangential plane projection of the insert axis about the same arc as used to define the other shorter lateral section. A continuous groove with sides perpendicular to the outer tapered surface of the insert can thus be defined. When a trapezoidal shaped O-ring is deposited within groove 20, the sides of the groove will support the O-ring against pressure in precisely the manner dictated by good practice with more conventional O-rings and O-ring grooves. However, a trapezoidal shaped O-ring has been defined around a cylindrical insert hole 10b. By machining the groove 20 in this manner, the sides of the groove are perpendicular to the exterior of the insert and the cross-sectional area of the groove is uniform over its entire path. Proper lateral support can therefore be provided to O-ring 18 in groove 20.

After insert 10 has been positioned within the tapered bore of body 6, a lubricating fitting 14 can be secured within the end section of plug 2 in the manner shown in FIG. 1. An adjusting nut 16 can then be threaded along the exterior of grease fitting 14. Movement of nut 16 relative to grease fitting 14 will eventually bring nut 16 into abutment with the upper surface of insert adjusting nut 12. Continued rotation of nut 16 can then be used to shift cylindrical plug 8 relative to the insert 10 and body 6 to precisely align the plug 8 relative to the body, the insert, and the inlet and outlet ports. Similar adjustments may be provided on the opposite end of the plug.

The tool, as shown in FIG. 1, can be lubricated by injecting lubricant from opposite ends of the plug valve through conventional grease fittings attached at the lower stem end of plug 8 and to the grease fitting 14 at the upper end of the plug. Lubricant can then be inserted first into axial lubricating channels 26 and 32. Lubricant then flows through radial lubricating channels 28 and 30 which are oriented to communicate with the inner rectilinear lubricating groove 24 surrounding each insert port 10b. Adequate lubrication wiping the entire sealing surface 22 can thus be provided between the rotatable cylindrical plug and the cylindrical bore of the insert while maintaining metal-to-metal gas tight seal surfaces along inwardly protruding metal-to-metal sealing surfaces 22.

Although the invention has been described in terms of the specified embodiment which is set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A plug valve for use in controlling fluid flow, including the flow of gas, in a fluid transmission conduit comprising:
    a body having a tapered bore transversely positionable in intersecting relationship to the fluid transmission conduit and having inlet and outlet ports alignable with the fluid transmission conduit;
    a cylindrical plug rotatable about an axis perpendicular to the body ports and having a passageway extending therethrough perpendicular to the plug axis of rotation and being selectively alignable with the ports to permit fluid transmission therethrough;
    at least one insert positioned with the insert axis parallel to the plug axis within the tapered body bore between the body and the plug and having a tapered exterior surface and a cylindrical inner bore with insert holes extending therethrough aligned with the body ports;
    a nut engaging the body and the insert to hold the insert in alignment with the body; and
    means for introducing lubricant through the plug and depositing lubricant within the cylindrical bore of the insert only between the plug and insert into separate continuous grooves in surrounding relationship to the plug passageway at each end of the plug passageway when the plug valve is in the open position.

2. The plug valve of claim 1 wherein a continuous groove is formed on the inner bore of the insert and extending around the insert holes, the groove communicating with the means for introducing lubricant through the plug.

3. The plug valve of claim 2 further comprising an close fitting sealing surface on the cylindrical bore of the insert in surrounding relationship to each insert hole establishing a gas tight metal-to-metal seal with the exterior of the plug.

4. The plug valve of claim 3 wherein the close fitting sealing surface comprises an inwardly protuberant surface on the cylindrical bore of the insert, the groove being defined on the inwardly protuberant surface around the insert holes, intermediate the insert holes and the edges of the inwardly protuberant surface.

5. The plug valve of claim 2 wherein the continuous groove is rectilinear.

6. The plug valve of claim 5 wherein the groove defines the continuous tracing of a stationary workpiece defined by linear movement of the insert in the direction of the insert axis, followed by partial rotation of the insert means about the insert axis, followed by linear movement of the insert in the opposite direction of the insert axis, followed by rotation of the insert means in the opposite direction to form a continuous rectilinear groove, the radial relationship of the insert means and the workpiece remaining constant.

7. The plug valve of claim 6 wherein the contour of the groove is defined by the continuous movement of a spherical workpiece, the contour of the groove having a curved profile.

8. The plug valve of claim 1 further comprising a trapezoidal seal disposed on the exterior of the insert between the insert and the body, the seal encompassing the insert holes.

9. The plug valve of claim 8 wherein the seal is received within a continuous recess encompassing the insert holes, the seal being laterally supported by the sides defining the recess.

10. The plug valve of claim 9 wherein the continuous recess is defined in the exterior surface of the insert.

11. The plug valve of claim 10 wherein the continuous recess has a contour corresponding to the tracing of a workpiece in a plane tangent to the tapered exterior surface of the insert and comprising a first longitudinal section defined by relative longitudinal movement of the insert parallel to the projection of the insert axis in the tangential plane, a first lateral section defined by rotation of the insert about the tangential plane projection of the insert axis, a second longitudinal section defined by longitudinal movement in the opposite direction parallel to the tangential plane projection of the insert axis and parallel to the direction of movement defining the first longitudinal section, and a second lateral section defined by rotation of the insert in the opposite direction to form a continuous trapezoidal recess on the insert tapered exterior surface, the radial relationship of the tapered surface of the insert and the workpiece remaining constant.

12. The plug valve of claim 11 wherein the cross-sectional shape of the recess is uniform.

13. The plug valve of claim 1 wherein the means for introducing lubricant through the plug comprises at least one axial channel communicating with at least one radial channel intersecting the exterior of the plug.

14. The plug valve of claim 13 wherein axial channels extending inwardly from the opposite ends of the plug, each axial channel intersecting separate radial channels which radially intersect the exterior of the plug at circumferentially spaced locations whereby lubricant is deposited at both ends of the passageway through separate communicating channels.

15. The plug valve of claim 14 wherein each radial channel extends perpendicular to a separate groove formed on the cylindrical bore of the insert.

16. The plug valve of claim 14 further comprising a first fitting engaging the plug and slidable relative to the body and having a lubricating channel communicating with the axial channel at one end of the plug valve, and a second fitting adjustably engaging the first fitting and engaging the nut member to shift the plug along the plug axis relative to the body to align the plug relative to the body and the insert.

17. A plug valve for use in controlling fluid flow, including the flow of gas, in a fluid transmission conduit comprising:

a body having a bore transversely positionable in intersecting relationship to the fluid transmission conduit and having inlet and outlet ports alignable with the fluid transmission conduit;

a cylindrical plug rotatable about an axis perpendicular to the body ports and having a passageway extending therethrough perpendicular to the plug axis of rotation and being selectively alignable with the ports to permit fluid transmission therethrough;

at least one insert positioned with the insert axis parallel to the plug axis within the body bore between the body and the plug and having an exterior surface and a cylindrical inner bore with insert holes extending therethrough aligned with the body ports;

a securing member engaging the body and the insert to hold the insert in alignment with the body;

a close fitting sealing surface on the insert surrounding each insert hole establishing a gas tight metal-to-metal seal with the exterior of the plug;

an insert groove in surrounding relationship to each insert hole, the groove being centrally disposed on the sealing surface whereby lubricant progressively wipes the sealing surface on both sides of the groove as the plug rotates; and means for introducing lubricant through the plug and depositing lubricant only in the insert groove surrounding each insert hole.

* * * * *